Oct. 13, 1931.  E. S. STEPHENS  1,827,547
TESTING DEVICE
Filed Aug. 29, 1925   2 Sheets-Sheet 2
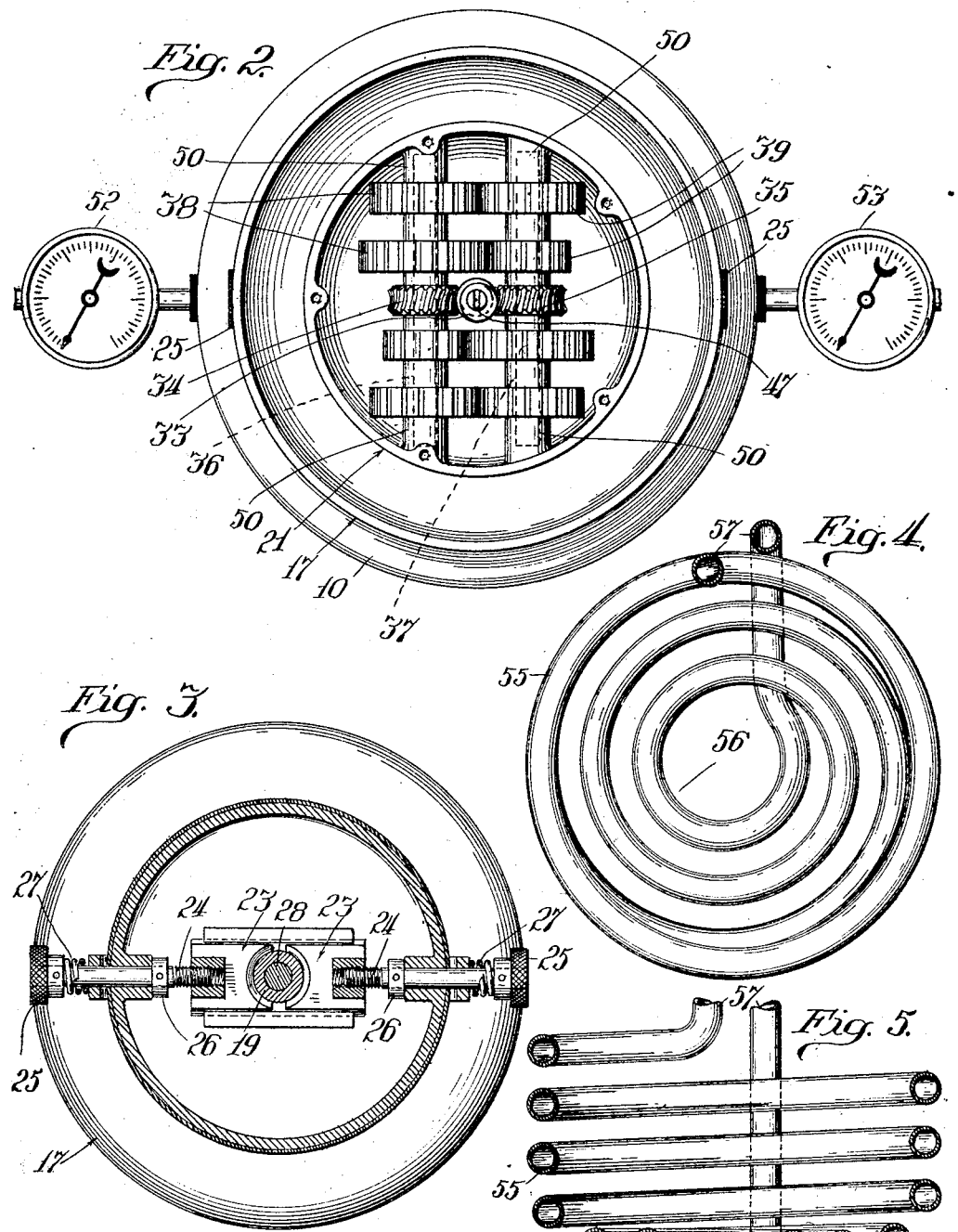

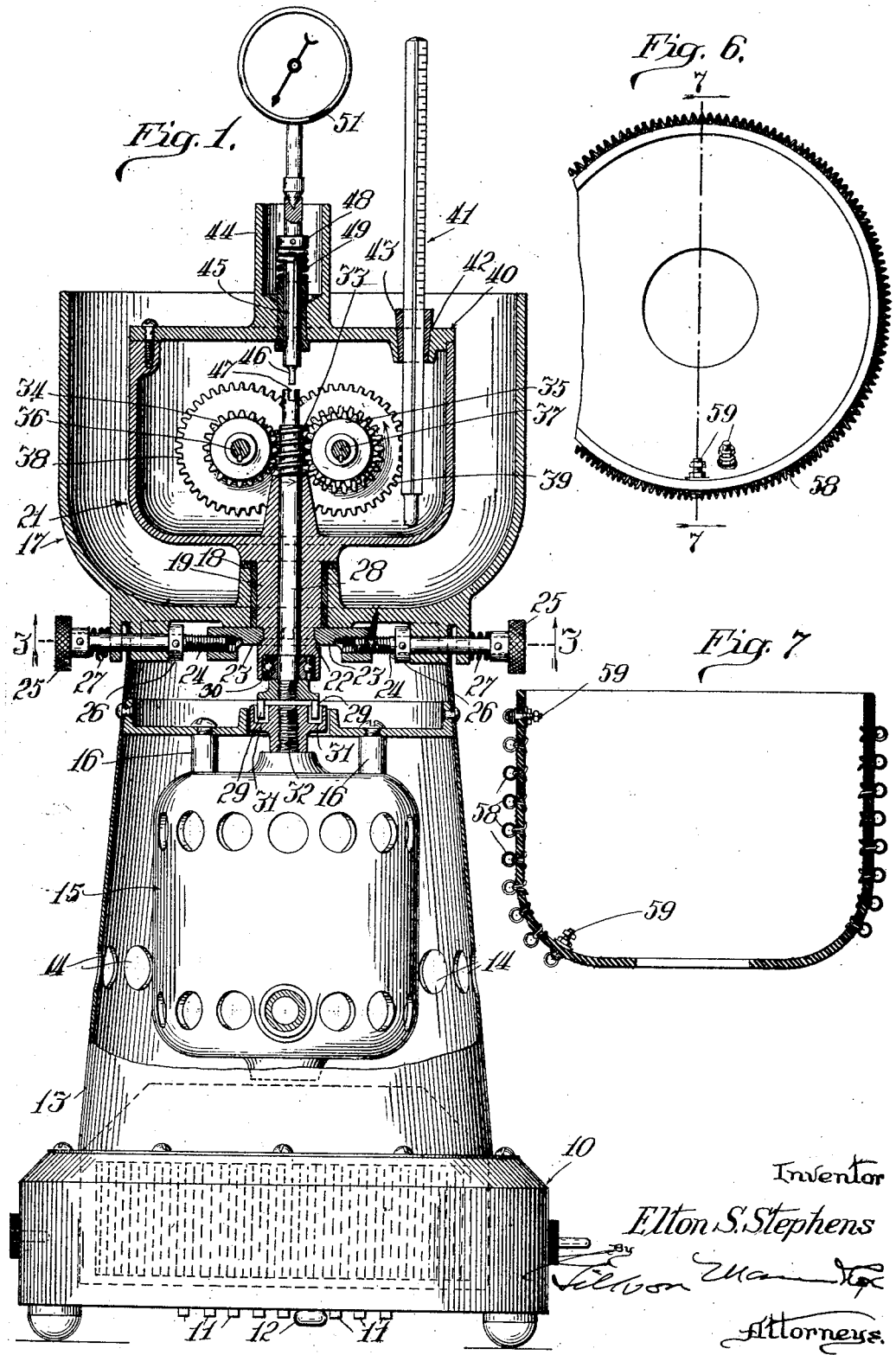

Patented Oct. 13, 1931

1,827,547

UNITED STATES PATENT OFFICE

ELTON S. STEPHENS, OF CHICAGO, ILLINOIS, ASSIGNOR TO CENTRAL COMMERCIAL COMPANY, A CORPORATION OF ILLINOIS

TESTING DEVICE

Application filed August 29, 1925. Serial No. 53,392.

This invention relates to testing devices, and one of the objects of the invention is the provision of a new and improved device for determining the relative consistency or viscosity of fluids.

Another object of the invention is the provision of new and improved means for determining the temperatures at which lubricating oils such as the transmission oils for automobiles, will "channel", i. e. at what temperatures the different grades of lubricating oils surrounding transmission or other gears will have channels formed in them during the operation of the gears.

A further object of the invention is the provision of a new and improved device for testing the relative consistency of viscosity of liquids at different temperatures, together with means for lowering the temperature of the liquid without removing the same from the device.

Another object of the invention is the provision of a new and improved device for simultaneously determining the temperature of the oil, the rate of speed of the testing mechanism and the amount of current consumed in overcoming the frictional resistance offered by the liquid to the movement of the mechanism through the same.

A still further object of the invention is the provision of a testing device that is simple in construction, cheap to manufacture, easily assembled, efficient in operation, occupies a minimum amount of space, and that is not likely to become broken or get out of order.

Other and further objects and advantages of the invention will appear from the following description, taken in connection with the accompanying drawings, in which Fig. 1 is an elevation of the device, showing the upper portion of the same in vertical section;

Fig. 2 is a plan view of the device, with the closure for the oil receptacle removed;

Fig. 3 is a section on line 3—3 of Fig. 1;

Fig. 4 is a plan view of a cooling element;

Fig. 5 is a vertical section thereof;

Fig. 6 is a plan view of a heating element; and

Fig. 7 is a cross-sectional view on line 7—7 of Fig. 6.

In the use of oils for lubricating the transmission mechanism of automobiles and the like, it is desirable that the oil be of such composition that it will remain fluid during all weather conditions. When the oil in a transmission case under low temperatures stiffens, or what may be termed congeals, it is said to "channel", i. e. the gears, during their operation, will form channels in the oil. While in this condition the lubricating quality of the oil is greatly impaired. In fact oil at temperatures sufficiently low to cause it to channel has practically no lubricating qualities.

Practically all, if not all, oils will "channel" at low temperatures. Certain classes of oils will channel at much lower temperatures than others, and since oils having low "channeling" points are necessary for automobile lubrication it is desirable that means be provided for determining the channeling points of the different grades and classes of oils in order to know what classes or grades to employ when the same is subjected to low temperatures.

The present invention provides a device for ascertaining the temperature at which the different grades and classes of oils will channel. The device will also give other information that is valuable in determining other qualities of the oil or other liquid, as will presently appear.

The device, broadly considered, comprises a receptacle in which a movable mechanism is mounted. Oil or other liquid that is to be tested is placed in the receptacle and the mechanism operated. The resistance offered by the oil, or other liquid, to the operation of the mechanism is measured by suitable instruments. Means are also provided for lowering the temperature of the liquid within the receptacle, whereby tests may be made at different temperatures of the oil or other liquid.

In the form of the device selected to illustrate one embodiment of the invention, the reference numeral 10 designates a hollow base in which is adapted to be mounted a rheostat of any approved construction. The rheostat is provided with a suitable number of contact points 11, and with a switch lever 12 for engaging the contact points for regulating the amount of current flowing through the device, as is usual in such constructions. A tubular support 13 is mounted on the base 10. This support may be, and preferably is, sheet metal having suitable openings 14 therein to permit the circulation of air within the same. A motor 15, of any suitable construction, is mounted within the support 13, as by being supported by suitable brackets 16. The motor and rheostat are arranged within the base and support of the device for the purpose of convenience in assembly. This arrangement also provides a device that is compact and neat in appearance.

Rigidly mounted on the support 13 in any suitable manner is an ice container 17, in which is rotatably mounted the liquid receptacle 21. The container 17 is provided with an axial bearing or hub 18, in which is rotatably mounted the journal 19 formed on said receptacle. The journal 19 extends axially downwardly from the receptacle 21, and its lower end is provided with a reduced portion forming an inclined shoulder 22 which is adapted to be engaged by one or more shoes or brake members 23 for preventing the removal of the receptacle from the container. The brake members may be forced into frictional engagement with the reduced portion and shoulder 22 for preventing the rotation of the receptacle. The brake members or shoes 23, of which two are employed, 180° apart, are moved in and out by means of bolts or rods 24 which are screw-threaded into said brake members. The bolts are provided with knurled heads 25 for rotating the same. Collars 26 prevent the withdrawal of these bolts, and springs 27 are interposed between the heads 25 and the portion of the device through which the rods extend for holding the collars against the member through which the bolts or rods 24 extend.

The journal 19 is provided with a central bore in which is rotatably mounted a shaft 28. The lower end of the shaft 28 is provided with fingers 29 for engaging corresponding recesses 31 in the upper end of the motor shaft 32 for interlocking therewith. By means of this connection the shaft 28 may be disconnected from the motor by moving said shaft upwardly. A suitable anti-friction bearing 30 may be provided for the lower end of the shaft 28. The upper end of the shaft 28 is provided with a worm 33, which is adapted to engage a pair of gears 34, 35, on the shafts 36, 37, which are journaled in bearings 50 rigidly secured to the receptacle 21. A system of intermeshed gears 38 and 39, simulating transmission or change speed gears of an automobile, are mounted on the shafts 36, 37. The arrangement of the gears is immaterial, it being only necessary that a system of gearing be employed. For instance, the gears 38 on one end of the shaft 36 may be loose on said shaft and the gears 39 on the opposite end of the shaft 37 may likewise be loose on said shaft.

The receptacle 21 is adapted to contain oil. In order to prevent the centrifugal force from throwing the oil out of the receptacle during the operation of the device, the receptacle is provided with a closure 40 which may be held in closed position by any suitable means, such as screws.

For the purpose of determining the temperature of the oil within the receptacle during the operation of the device, a thermometer 41 is inserted through an opening 42 in the closure 40. The thermometer is secured in proper position by inserting the same through a cork or stopper 43, which in turn is inserted in the opening 42. By means of this arrangement the thermometer may be adjusted to the desired depth by sliding the same through said stopper.

Suitable means are provided for determining the R. P. M. of the shaft 28. Any suitable means may be provided for that purpose. As shown, the closure 40 is provided with a hub 44 in which is rotatably mounted a shaft 45. The shaft is provided on its lower end with a flattened portion 46, which is adapted to engage a corresponding opening 47 in the upper end of the shaft 28 for locking the two shafts together, and for permitting the same to be disengaged when the closure 40 is removed from the receptacle 21. The shaft 45 is preferably provided with a collar 48, which is adapted to be engaged by a spring 49 for holding the shaft 45 normally out of contact with the shaft 28.

In determining the rate of rotation of the shaft 28 a tachometer 51 is placed in engagement with the upper end of the shaft 45, forcing the shaft downwardly until it interlocks with the shaft 28, after which the reading may be taken. A voltmeter 52 and an ammeter 53 are employed for measuring the voltage and current that operate the motor.

Suitable means are provided for varying the temperature, at will, of the liquid in the container. One of the simplest ways of lowering the temperature of the liquid is to place a freezing element, such as broken or cracked ice and salt, in the container around the receptacle 21. The brake shoes or members 23 are retracted a sufficient distance to permit of free rotation of the member 22, but not far enough to permit the removal of the receptacle. Under these conditions when the device is operated the resistance offered by the oil to the turning of the mechanism in the receptacle 21 will cause said receptacle to rotate, thereby lowering the temperature of the oil or other liquid, somewhat after the manner of an ice cream freezer.

When the oil is lowered to the desired temperature the brake members or shoes 23 are forced into frictional contact with the member 22 for preventing the rotation of the receptacle 21. The current is again turned on, and note taken of the number of volts, amperes and the rate of rotation of the shaft 28. After a number of readings have been taken of the temperature, rate of rotation of the shaft 28, the voltage and the amperage, a curve may be plotted showing the characteristics of the particular liquid that is being tested. It has been found that when oil has been lowered to the temperature where it will channel, on starting the device the R. P. M. of the shaft is much retarded and the amperage very high, and after the channels are cut in the oil the R. P. M. very greatly increases and the amperage decreases very materially. It is thus possible to determine the exact point where the oil "channels" by examining the plotted curves of the operation of the device at different temperatures. In making comparative tests of liquids the receptacle 21 is filled to the same depth with each liquid tested.

The temperature of the liquid within the receptacle may also be lowered by the use of an expansion coil 55. (See Figs. 4 and 5.) This coil is of tubular material and is preferably shaped to conform to the lower portion of the receptacle. In other words, it is in the form of a nest for engaging about the sides and bottom of the receptacle 21, and having an opening 56 through which the journal 19 extends. When it is desired to lower the temperature, the brake members 23 are retracted a sufficient distance to permit the lower end of the member 19 to pass between said shoes, after which the receptacle is removed from the container, the expansion coil is placed in the container, and the receptacle replaced. The ends 57 of the expansion coil are then connected to a mechanical refrigerating apparatus, which, by the expansion of a volatile fluid in the coils in the usual manner, will lower the temperature of the liquid in the receptacle. Since the refrigerating mechanism constitutes no part of the present invention, it is not thought necessary to illustrate or describe the same.

Suitable means are also provided for raising the temperature of the liquid within the receptacle, in order that tests may be made at temperatures above that of the atmosphere. A heating element, such as that shown in Fig. 6, may be employed for this purpose. As shown, the heating element 58 comprises electrical conductors of high resistance arranged in substantially the same shape and applied in the same manner as the cooling element shown in Fig. 4. The heating element 58 is provided with terminals 59, which are adapted to be connected to suitable leads for supplying an electrical current for heating the element, which in turn will heat the liquid in the container.

It will thus be apparent that the consistency or viscosity of the liquids at different temperatures may be determined by this device and a curve plotted to graphically show the same.

It is thought from the foregoing, taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. An oil testing device comprising a container adapted to contain a freezing element, a receptacle rotatably mounted within said container for containing a liquid, gear mechanism within said container, means for operating said mechanism, a voltmeter and ammeter for measuring the current consumed in operating said mechanism, means for measuring the temperature of the liquid in the receptacle, and means for determining the number of revolutions per minute of the drive shaft of the gear mechanism.

2. In a device of the class described, a hollow base adapted to contain a rheostat, a support mounted on said base, a motor within said support, a container mounted on said support and adapted to contain a freezing element, a bearing formed on said container, a receptacle, a depending journal on said receptacle for engaging said bearing on said container, gear mechanism rotatably mounted within said receptacle, means operated by said motor and including a member rotatable in said journal, for operating said mechanism and thereby, due to friction, rotating said receptacle, and brake mechanism for preventing the rotation of said receptacle.

3. In an oil testing device, a base, a motor, a container supported by said base, a receptacle rotatably mounted in said container and adapted to contain oil, gear mechanism within said receptacle, a shaft operated by said motor and extending into said receptacle for operating said mechanism and, thereby, due to friction, rotating said receptacle, and brake mechanism for preventing rotation of said receptacle when said shaft is rotated, whereby upon the operation of said motor said gear mechanism will be operated independently of said receptacle.

4. An oil testing device comprising a container, a receptacle rotatably mounted in said container and adapted to contain the oil to be tested, said container adapted to contain a temperature changing medium for varying the temperature of the oil in said receptacle, liquid agitating mechanism within said receptacle, means for operating said mechanism, and thereby, due to friction, rotating said receptacle, means for controlling the rotation of said receptacle relative to the operation of said mechanism, and means for measuring the work expended in operating said mechanism.

In testimony whereof I affix my signature.

ELTON S. STEPHENS.